(12) United States Patent
Fadgen et al.

(10) Patent No.: US 11,085,540 B2
(45) Date of Patent: Aug. 10, 2021

(54) CIRCUMFERENTIAL AIR RIDING CARBON SEAL ON CERAMIC RUNNER

(71) Applicant: Rolls-Royce Corporation, Indianapolis, IN (US)

(72) Inventors: Daniel Lawrence Fadgen, Indianapolis, IN (US); Jared Isamu Taketa, Indianapolis, IN (US); Joseph A. Swift, Indianapolis, IN (US); Daniel Feinstein, Zionsville, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 119 days.

(21) Appl. No.: 16/205,881

(22) Filed: Nov. 30, 2018

(65) Prior Publication Data

US 2020/0173556 A1 Jun. 4, 2020

(51) Int. Cl.
| | |
|---|---|
| *F16J 15/44* | (2006.01) |
| *F01D 11/00* | (2006.01) |
| *F16J 15/16* | (2006.01) |
| *F02C 7/28* | (2006.01) |
| *F16J 15/34* | (2006.01) |

(52) U.S. Cl.
CPC ............. *F16J 15/44* (2013.01); *F01D 11/003* (2013.01); *F16J 15/441* (2013.01); *F02C 7/28* (2013.01); *F16J 15/164* (2013.01); *F16J 15/3452* (2013.01)

(58) Field of Classification Search
CPC .... F16J 15/3452; F16J 15/3464; F16J 15/441; F01D 11/003; F02C 7/28
See application file for complete search history.

(56) References Cited

U.S. PATENT DOCUMENTS

| | | | | |
|---|---|---|---|---|
| 2,956,824 | A * | 10/1960 | Kuchler | F01D 11/003 277/500 |
| 3,874,677 | A * | 4/1975 | Ludwig | F16J 15/441 277/425 |
| 4,969,652 | A * | 11/1990 | Munson | F01D 11/003 277/543 |
| 4,971,306 | A * | 11/1990 | Jinnouchi | F01D 11/003 277/544 |
| 5,593,165 | A * | 1/1997 | Murray | F01D 11/003 277/543 |

(Continued)

FOREIGN PATENT DOCUMENTS

EP 2474711 A2 7/2012

*Primary Examiner* — Nicholas L Foster
(74) *Attorney, Agent, or Firm* — Barnes & Thornburg LLP

(57) ABSTRACT

Systems and methods are disclosed for sealing a high pressure fluid cavity from a low pressure fluid cavity in a rotating machine such as a gas turbine engine. The cavities are at least partially disposed between a rotatable shaft and a sump housing radially displaced from the rotatable shaft. A seal assembly comprises an air riding carbon seal ring and a circumferential ceramic runner. The carbon seal ring is sealingly engaged with the sump housing and has a radially inward facing seal surface. The circumferential ceramic runner is carried by the shaft and has a radially outward facing seal surface extending axially along the shaft. The radially inward facing seal surface of the air riding carbon seal ring sealingly engages the radially outward facing seal surface of the ceramic runner during rotation of the rotatable shaft at a predetermined range of rotational speeds.

19 Claims, 2 Drawing Sheets

(56) References Cited

U.S. PATENT DOCUMENTS

| | | | | |
|---|---|---|---|---|
| 5,813,830 A * | 9/1998 | Smith | ............. | F16J 15/442 277/349 |
| 6,145,840 A | 11/2000 | Pope | | |
| 7,175,388 B2 * | 2/2007 | Labbe | ............. | F01D 11/003 415/174.5 |
| 7,410,341 B2 * | 8/2008 | Gockel | ............. | F01D 25/125 415/110 |
| 7,938,402 B2 * | 5/2011 | Garrison | ............. | F16J 15/3448 277/348 |
| 8,490,982 B2 * | 7/2013 | Roche | ............. | F01D 11/02 277/411 |
| 8,657,297 B2 | 2/2014 | Garrison | | |
| 9,309,975 B2 * | 4/2016 | Kostka | ............. | F16J 15/443 |
| 9,359,912 B2 * | 6/2016 | Ullah | ............. | F01D 25/183 |
| 9,638,326 B2 | 5/2017 | Haynes | | |
| 9,989,083 B2 * | 6/2018 | Labbe | ............. | F02C 7/06 |
| 10,174,845 B2 * | 1/2019 | Fadgen | ............. | F16J 15/3464 |
| 10,260,636 B2 * | 4/2019 | Kostka | ............. | F16J 15/445 |
| 10,544,866 B2 * | 1/2020 | Fadgen | ............. | F16J 15/441 |
| 10,571,028 B2 * | 2/2020 | Burnside | ............. | F16J 15/3464 |
| 10,753,219 B2 * | 8/2020 | Labbe | ............. | F01D 25/183 |
| 2006/0239816 A1 * | 10/2006 | Labbe | ............. | F01D 11/003 415/230 |
| 2007/0025835 A1 * | 2/2007 | Gockel | ............. | F01D 25/125 415/110 |
| 2010/0213674 A1 * | 8/2010 | Garrison | ............. | F01D 11/02 277/405 |
| 2012/0177486 A1 * | 7/2012 | Ullah | ............. | F16J 15/3464 415/174.3 |
| 2013/0147123 A1 * | 6/2013 | Davies | ............. | F01D 11/02 277/348 |
| 2013/0285331 A1 * | 10/2013 | Kostka | ............. | F16J 15/445 277/411 |
| 2014/0159317 A1 | 6/2014 | Jahn | | |
| 2014/0265145 A1 * | 9/2014 | Copeland, III | ...... | F16J 15/3496 277/405 |
| 2014/0265151 A1 * | 9/2014 | Vasagar | ............. | F01D 11/003 277/500 |
| 2016/0186865 A1 * | 6/2016 | Kostka | ............. | F16J 15/445 277/301 |
| 2016/0348522 A1 * | 12/2016 | Labbe | ............. | F16C 17/02 |
| 2016/0348792 A1 * | 12/2016 | Labbe | ............. | F01D 25/183 |
| 2017/0234430 A1 * | 8/2017 | Fadgen | ............. | F16J 15/3464 277/500 |
| 2017/0234432 A1 * | 8/2017 | Burnside | ............. | F16J 15/441 277/572 |
| 2019/0136980 A1 * | 5/2019 | Fadgen | ............. | F16J 15/441 |
| 2020/0072358 A1 * | 3/2020 | Feinstein | ............. | F16J 15/54 |
| 2020/0173557 A1 * | 6/2020 | Fadgen | ............. | F16J 15/3464 |
| 2020/0224769 A1 * | 7/2020 | Black | ............. | F16J 15/44 |

* cited by examiner

CIRCUMFERENTIAL AIR RIDING CARBON SEAL ON CERAMIC RUNNER

BACKGROUND

Seals and seal assemblies may be used to isolate cavities of different pressures in a machine. For example, in a gas turbine engine a seal assembly may be used to buffer a sump from higher pressure and temperature airflows elsewhere in the engine. Seal assemblies in rotating machines such as gas turbine engines typically require a direct application of oil to cool the region near where a seal member contacts a rotating member such as the seal runner that is attached to the shaft. This region is subject to high heat generation during shaft rotation.

SUMMARY

According to some aspects of the present disclosure, a seal assembly is disclosed for sealing a higher pressure fluid cavity from a lower pressure fluid cavity. The cavities are at least partially disposed between a rotatable shaft and a sump housing radially displaced from said rotatable shaft. The seal assembly comprises an air riding carbon seal ring and a circumferential ceramic runner. The air riding carbon seal ring is sealingly engaged with said sump housing and has a radially inward facing seal surface. The circumferential ceramic runner is carried by the shaft and has a radially outward facing seal surface extending axially along the shaft. The radially inward facing seal surface of said air riding carbon seal ring sealingly engages said radially outward facing seal surface of said ceramic runner during rotation of said rotatable shaft at a predetermined range of rotational speeds.

In some embodiments the radially inward facing seal surface of said air riding carbon seal ring sealingly engages said radially outward facing seal surface of said ceramic runner when said rotatable shaft is rotating below a predetermined rotational speed. In some embodiments said air riding carbon seal ring comprises a radially outward facing surface, and the seal assembly further comprises a seal housing disposed between said air riding carbon seal ring and said sump housing and a sealing body sealingly engaged between said sump housing and said seal housing.

In some embodiments seal housing defines an axially facing surface, and wherein said air riding carbon seal ring sealingly engages said axially facing surface. In some embodiments the seal assembly further comprises an axial coil spring contacting said air riding carbon seal ring at a surface opposite said axially facing surface of said seal housing, said axial coil spring forcibly engaging said air riding carbon seal ring to said seal housing. In some embodiments the seal assembly further comprises a back plate in contact with said axial coil spring. In some embodiments the seal assembly further comprises a mounting element affixed around a circumference of the shaft and carrying the ceramic runner.

In some embodiments the seal assembly further comprises a garter spring positioned radially outward of said air riding carbon seal ring and assisting with the sealing engagement of said air riding carbon seal ring to said ceramic runner. In some embodiments said ceramic runner comprises one or more of silicon nitride, silicon carbide, and alumina.

According to further aspects of the present disclosure, an oil-free circumferential seal assembly is disclosed for a machine having a rotatable shaft and an axis of rotation. The seal assembly comprises a circumferential air riding carbon seal ring, a ceramic runner, a mounting element, and a garter spring. The seal ring has a radially inward facing seal surface and a radially outward surface. The ceramic runner has a radially outward facing seal surface extending axially along the shaft. The mounting element is affixed around a circumference of the shaft and carries the ceramic runner. The garter spring is coupled to the radially outward facing surface of the seal ring. The garter spring sealingly engages the radially inward facing seal surface of the seal ring with the radially outward facing seal surface of the ceramic runner across a predetermined range of rotational speeds.

In some embodiments the seal assembly further comprises a seal housing disposed radially outward of the seal ring and a sealing body positioned between the seal housing and the sump housing. In some embodiments said seal housing defines an axially facing surface, and wherein said air riding carbon seal ring sealingly engages said axially facing surface.

In some embodiments the seal assembly further comprises an axial coil spring contacting said air riding carbon seal ring at a surface opposite said axially facing surface of said seal housing, said axial coil spring forcibly engaging said air riding carbon seal ring to said seal housing. In some embodiments said ceramic runner comprises silicon nitride, silicon carbide, or alumina.

According to further aspects of the present disclosure, a method is presented of sealing a high pressure fluid cavity from a low pressure fluid cavity. The cavities are at least partially disposed between a rotatable shaft and a sump housing radially displaced from said rotatable shaft. The method comprises providing a circumferential ceramic runner having a radially outward facing seal surface extending axially along the shaft and an air riding carbon seal ring having a radially inward facing seal surface; and rotating said rotatable shaft within a predetermined range of rotational speeds to sealingly engage said radially inward facing seal surface of said air riding carbon seal ring with said radially outward facing seal surface of said ceramic runner.

In some embodiments the method further comprises providing a seal housing coupled to said sump housing; and engaging said air riding carbon seal ring with said seal housing. In some embodiments said air riding carbon seal ring comprises a radially outward facing surface, and the method further comprises engaging a garter spring about the radially outward facing surface of the air riding carbon seal ring.

In some embodiments said seal housing defines an axially facing surface, and the method further comprises sealingly engaging the air riding carbon seal ring to said axially facing surface. In some embodiments the method further comprises contacting said air riding carbon seal ring at a surface opposite said axially facing surface with an axial coil spring, said axial coil spring forcibly engaging said air riding carbon seal ring to said seal housing. In some embodiments the method further comprises providing a mounting element affixed around a circumference of the shaft and carrying the ceramic runner; and flexing the ceramic runner relative to the shaft.

BRIEF DESCRIPTION OF THE DRAWINGS

The following will be apparent from elements of the figures, which are provided for illustrative purposes.

Figure 1:
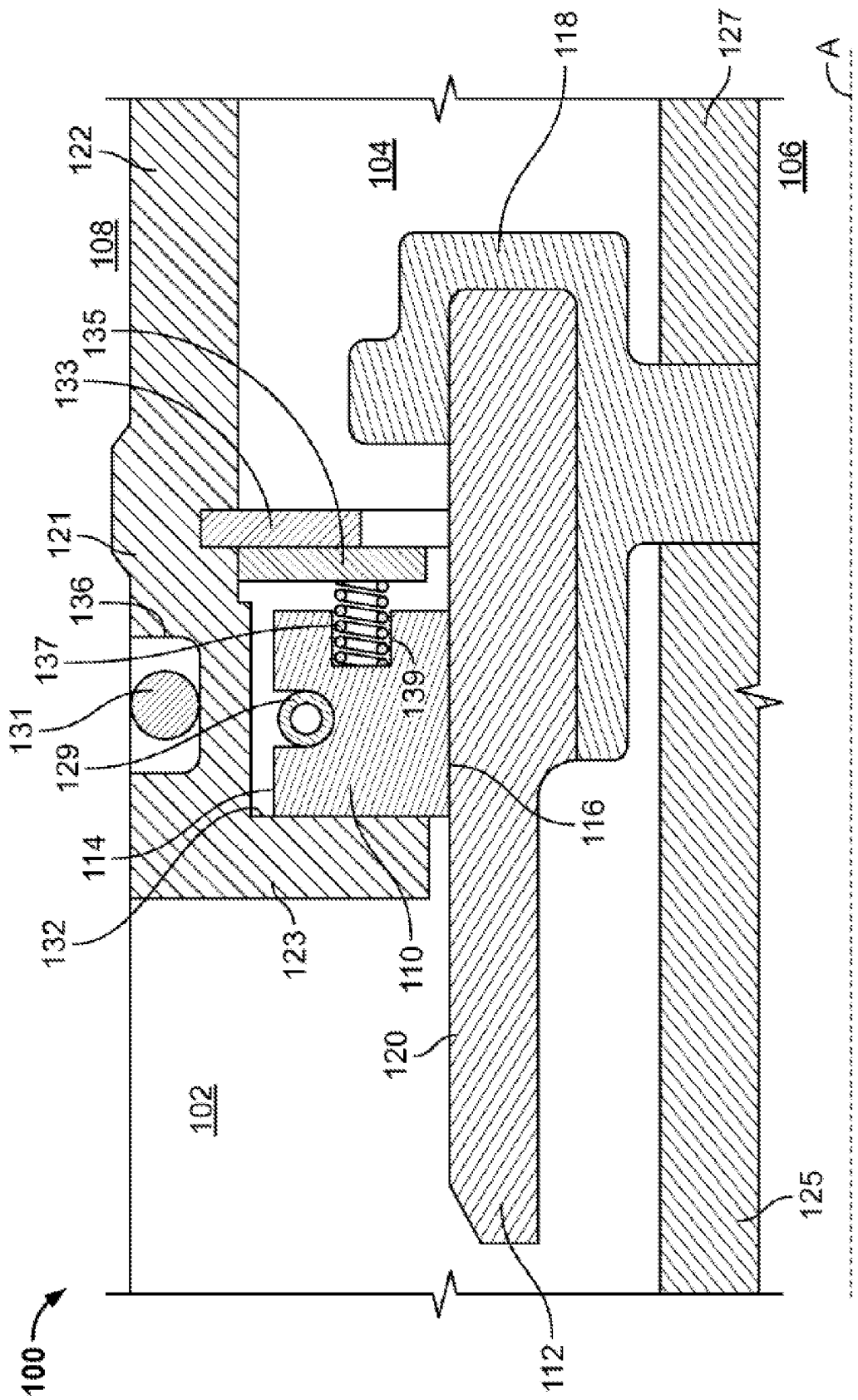
FIG. 1 is a schematic cross sectional view of a seal assembly in accordance with some embodiments of the present disclosure.

The present application discloses illustrative (i.e., example) embodiments. The claimed inventions are not limited to the illustrative embodiments. Therefore, many implementations of the claims will be different than the illustrative embodiments. Various modifications can be made to the claimed inventions without departing from the spirit and scope of the disclosure. The claims are intended to cover implementations with such modifications.

DETAILED DESCRIPTION

For the purposes of promoting an understanding of the principles of the disclosure, reference will now be made to a number of illustrative embodiments in the drawings and specific language will be used to describe the same.

Carbon seal assemblies typically comprise a seal member, sometimes referred to as a seal ring, that interfaces with a rotating component (normally called a runner) that is generally attached to a rotatable shaft in a rotating machine. Carbon seal assemblies usually require an application of oil to the underside of the runner. The region where the seal member and runner interact generates heat during rotation of the shaft. The oil is supplied to the underside of the runner to help dissipate the heat generated between the components.

Application of oil directly to the runner incurs a cost to the engine. The engine must be designed for adequate cooling, thus requiring intricate systems to deliver the oil to the runner. Failure of these oil systems risk failure of the seal assembly, so the use of direct application of oil introduces a vulnerability to the rotating machine.

Common types of seal assemblies used to isolate cavities of different pressures in a rotating machine include labyrinth seals and circumferential contacting carbon seals (CCCS) on metal runners. Labyrinth seals require a break-in period during which heat is generated by the seal while an abradable portion of the seal or runner is worn away by rotation of a shaft. After break in, a labyrinth seal generates little to no heat; however, these types of seals also have a fairly high leakage rate compared to CCCSs.

For a CCCS, friction between the seal member and the metal runner can cause significant heat generation that must be dissipated by a direct application of oil to the underside of the runner. Overheated seal members can cause excessive wear, requiring more frequent replacement and/or leading to an increased likelihood of seal failure. Overheated runners can cause oil coking, potential fire, and stresses on the runner above the yield limit. Overheated metal runners may also excessively expand, thus increasing the amount of seal wear. Further, after a CCCS fully wears in, it will become an archbound carbon seal. At this stage of its life, it will not maintain contact between the seal member and the metal runner during all engine operating conditions, leading to leakage past the seal at some points of engine operation.

The present disclosure is therefore directed to a seal assembly for a rotating machine such as a gas turbine engine that reduces or eliminates altogether the direct application of oil to the carbon seal runner. A seal assembly is disclosed having a circumferential air riding carbon seal ring and a ceramic runner. The sealing interface between these components during rotation of a shaft has a sufficiently reduced friction such that heat generated at the seal member/runner interface is low enough to not require dissipation by direct oil application.

The disclosed seal assembly may, in some embodiments, be an oil-free seal assembly. As used herein, oil-free indicates a lack of direct oil application. An oil mist may still be used in a cavity isolated by the seal assembly for general cooling purposes, and may be applied directly to other components in the cavity; however, oil is not directly applied to the seal runner itself.

A schematic cross sectional view of an embodiment of the seal assembly 100 is provided in FIG. 1. The seal assembly 100 seals a higher pressure fluid cavity 104 from a lower pressure fluid cavity 102. The higher and lower pressure fluid cavities 104, 102 may be at least partially disposed between a rotatable shaft 106 and a sump housing 108. The seal assembly 100 comprises a seal ring 110 and circumferential runner 112.

The higher pressure cavity 104 may be referred to as a first cavity, and may be, for example, a region of a rotating machine such as a gas turbine engine that receives and directs higher pressure and/or higher temperature airflow. The lower pressure cavity 102 may be referred to as a second cavity, and may be, for example, a region of a rotating machine such as a gas turbine engine that receives and directs lower pressure and/or lower temperature airflow. The lower pressure cavity 102 may be a sump.

The rotatable shaft 106 may define an axis A of the rotating machine. The rotatable shaft may be hollow. The sump housing 108 may be disposed about or radially outward of the rotatable shaft 106. The sump housing 108 may be radially displaced from the shaft 106. The sump housing 108 may be a static structure of the rotating machine (i.e. may not rotate).

The seal ring 110 is disposed between the sump housing 108 and the shaft 106. The seal ring 110 may be annular, and may be formed as a single member or may comprise more than one member. In embodiments having a seal ring 110 comprising more than one member, the member may be joined for example by slip joints. The seal ring 110 may have a radially outward facing surface 114 and a radially inward facing surface 116.

The seal ring 110 is an air riding seal ring. The seal ring 110 may be a circumferential air riding carbon seal ring. The seal ring 110 may comprise features for generating a riding film of air during rotation of the shaft 106. For example, the radially inward facing seal surface 116 of the seal ring 110 may include a scalloped surface feature that generating a riding film for the seal ring 110. The seal ring may comprise carbon.

The runner 112 may be an annular member and may be radially displaced from the shaft 106. The runner 112 may be carried by the shaft 106. The runner 112 may be carried by the shaft 106 via a runner mount 118. The runner 112 may have a radially outward facing surface 120 extending axially along the shaft 106. The rotation of runner 112 may generate a riding film for the seal ring 110.

The runner 112 may comprise ceramic. The runner 112 may comprise silicon nitride, silicon carbide, or alumina.

The seal ring 110 may sealingly engage the runner 112. A seal ring 110 that is sealingly engaged with a runner 112 is in contact with the runner 112 or in sufficient proximity to the runner 112 such that a seal is formed between the seal ring 110 and runner 112. The radially inward facing surface 116 of the seal ring 110 may sealingly engage the radially outward facing surface 120 of the runner 112. In some embodiments, at certain operating conditions the radially inward facing surface 116 of the seal ring 110 may contact the radially outward facing surface 120 of the runner 112.

In some embodiments, the seal assembly 100 further comprises a seal housing 122. The seal housing 122 may be disposed between the runner 112 and the sump housing 108, and/or between the seal ring 110 and the sump housing 108. The seal housing 122 may comprise an axially-extending portion 121 and a radially-extending portion 123. The axially extending portion 121 may be engaged with or in contact with the sump housing 108. The radially extending portion 123 may comprise an axially facing surface 132 and may be engaged with or in contact with the seal ring 110. The seal ring 110 may sealingly engage the axially facing surface 132 of the radially extending portion 123 of the seal housing 122. The seal ring 110 may be aided in sealingly engaging the axially facing surface 132 by the axial load on the seal ring 110 caused by the pressure difference between the higher pressure cavity 104 and lower pressure cavity 102.

In some embodiments, the seal assembly 100 further comprises a runner mount 118. The runner mount 118 may extend radially to space the runner 112 from the shaft 106. The runner mount 118 may allow for some relative movement between the runner 112 and the shaft 106, largely owing to different coefficients of thermal expansion of the materials of the runner 112 and the shaft 106. The runner mount 118 may be interference fit to the shaft 106, and may be axially held in position by one or both of a forward stop 125 and aft stop 127. The runner mount 118 may be referred to as a mounting element. The runner mount 118 may carry the runner 112.

In some embodiments, the seal assembly 100 further comprises a garter spring 129. The garter spring 129 may be disposed radially outward of and engaged with a radially outer surface of the seal ring 110. The garter spring 129 may aide with maintaining engagement of the seal ring 110 to the runner 112. The garter spring 129 may be configured such that the radially inward force of the garter spring 129 maintains contact of the seal ring 110 to runner 112 when the shaft 106 is rotating below a predetermined rotational speed. Once the shaft 106 rotates above the predetermined rotational speed, the centrifugal force acting on the seal ring 110 may exceed the radially inward force of the garter spring 129 such that the seal ring 110 is separated from the runner 112.

A sealing body 131, such as an O-ring, may be disposed between and sealingly engaged between the seal housing 122 and sump housing 108. The seal housing 122 may define a groove 136, and the sealing body 131 may be positioned in the groove 136.

In some embodiments, the seal assembly 100 further comprises one or more of a snap ring 133, back plate 135, and axial spring 137. The snap ring 133 may extend between the seal housing 122 and the runner 112, and may be positioned axially aft of the seal ring 110. The back plate 135 may be positioned axially forward of the seal ring 110 and adjacent and/or abutting the snap ring 133. The axial spring 137 may extend between the back plate 135 and the seal ring 110. The axial spring 137 may apply a force in an axially forward direction to aide in maintaining engagement of the seal ring 110 to the portion 123 of the seal housing 122. The axial spring 137 may be partly disposed in a recess 139 defined by the seal ring 110. The axial spring 137 may be a coil spring. The axial spring 137 may forcibly engage the seal ring 110 to the seal housing 122.

In a non-operating condition, the shaft 106 is not rotating and the garter spring 129 imparts a radially inward force on the seal ring 110 to maintain the seal ring 110 sealingly engaged against the runner 112. The axial spring 137 will impart an axially forward force on the seal ring 110 to maintain the seal ring 110 sealingly engaged against the seal housing 122. The seal ring 110 sealingly engaged with the runner 112 and seal housing 122 creates a seal between the higher pressure cavity 104 and the lower pressure cavity 102.

When the rotating machine begins to operate, the shaft 106 will initially be rotating below a predetermined rotational speed, during which time the radially inward force of the garter spring 129 will exceed the radially outward centrifugal forces acting on the seal ring 110 such that the seal ring 110 will remain sealingly engaged against the runner 112. The axial spring 137 will impart an axially forward force on the seal ring 110 to maintain the seal ring 110 sealingly engaged against the seal housing 122. The seal ring 110 sealingly engaged with the runner 112 and seal housing 122 creates a seal between the higher pressure cavity 104 and the lower pressure cavity 102.

Once the shaft 106 rotates above a predetermined rotational speed, the seal ring 110 is configured to generate a riding film of air between the radially inward facing seal surface 116 of the seal ring 110 and the radially outward facing seal surface 120 of the runner 112. The seal ring 110 may comprise various features to generate the riding film such as, for example, a scalloped radially inward facing seal surface 116. The seal ring 110 thus remains engaged with the runner 112 but, owing to the riding film of air, has a greatly reduced friction and heat generation between the seal ring 110 and runner 112.

The disclosed seal assembly 100 therefore provides an air riding seal ring 110 that sealingly engages a runner 112 during rotation of the shaft 106 at, over, or across a predetermined range of rotational speeds. The radially inward facing surface 116 of the seal ring 110 may sealingly engage the radially outward facing surface 120 of the runner 112 at, over, or across a predetermined range of rotational speeds.

The present disclosure provides numerous advantages over existing seal assemblies. The disclosed seal assembly 100 substantially reduced the heat generation as compared to a CCCS with metal runner. This reduction in heat generation results in a reduction and/or elimination of the need for direct application of oil for cooling purposes. Thus, the disclosed seal assembly, particularly in embodiments comprising a Circumferential Air Riding Carbon Seal for the seal ring 110 and a ceramic runner for runner 112, is intended to be oil-free. Use of a Circumferential Air Riding Carbon Seal for the seal ring 110 reduces the radial contact force between the seal ring 110 and the runner 112, thus greatly reducing heat generated by friction between these components.

Advantages of a low-heat-generation, oil-free seal assembly (seal assembly lacking direct application of oil) include reduced risk of oil coking, fires, excessive stresses on the runner, and excessive wear of the seal ring. Additionally, the removal of the requirement to directly apply oil to the seal ring/runner interface may result in smaller sump sizes (owing to a lower volume of oil to be collected in the sump), smaller and more simple systems associated with direct application of oil (oil passageways, breathers, etc.), and less overall system complexity.

Replacement of a metal runner, as used in a CCCS with metal runner seal assembly, with a ceramic runner is also advantageous. Specifically, this replacement likely reduces the overall thermal expansion of the runner, which in turn results in lower friction and wear of the seal ring. Heat generated by friction between the seal ring and runner will not lead to excessive thermal expansion of the runner.

Another advantage of the disclosed seal assembly is an improved design margin on the operating envelope of a Circumferential Air Riding Carbon Seal for the seal ring 110. This type of seal ring uses the air riding feature to track relative movement of the shaft and runner. Since a ceramic runner will have less deflection than a metal runner, the air riding feature of the seal ring is not exposed to large deflections and will operate at or near the nominal design point for the seal ring. Further, since a Circumferential Air Riding Carbon Seal for the seal ring is better able to track and respond to the changing size and position of a runner, a wider range of ceramic materials may be used for the runner.

Thus the disclosed seal assembly provides a similar degree of sealing as a contacting carbon seal member with a metal runner, but achieves this performance level without the use of direct application of oil for cooling. Further, the useful lifetime of the carbon seal member is not significantly impacted when comparing the disclosed seal assembly to a contacting carbon seal member with metal runner embodiment.

Figure 2:
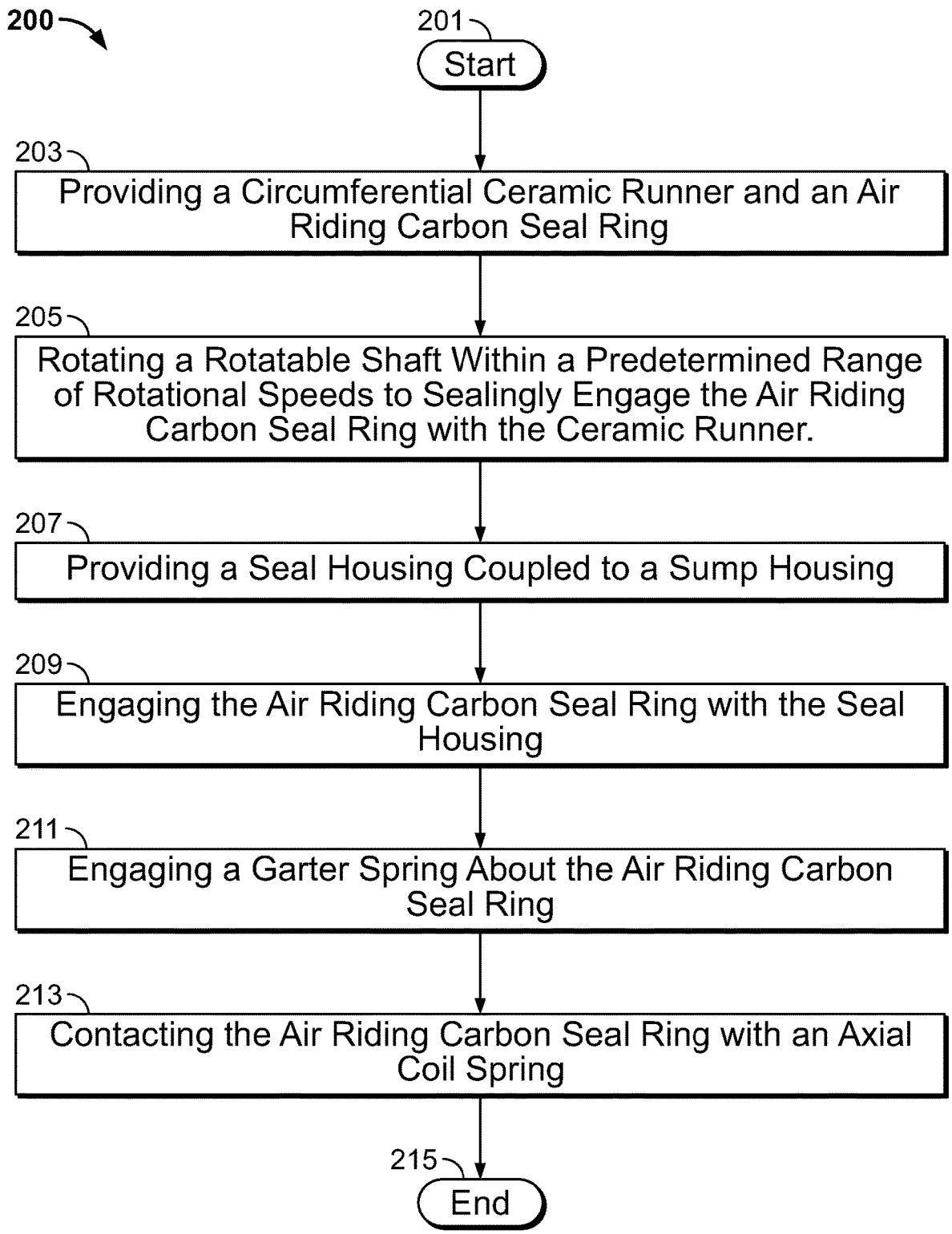
FIG. 2 is a flow diagram of a method in accordance with some embodiments of the present disclosure.

The present disclosure additionally provides methods of sealing a higher pressure fluid cavity 104 from a lower pressure fluid cavity 102. FIG. 2 provide a flow chart of one such method 200. The cavities 104, 102 may be at least partially disposed between a rotatable shaft 106 and a sump housing 108 that is radially displaced from the rotatable shaft 106. The rotatable shaft 106 may define an axis of rotation A.

Method 200 begins at Block 201. The steps of method 200, presented at Blocks 203 through 213, may be performed in the order presented in FIG. 2 or in another order. One or more steps of the method 200 may not be performed.

At Block 203, a circumferential ceramic runner 112 and an air riding carbon seal ring 110 are provided. The seal ring 110 is disposed between the sump housing 108 and the shaft 106. The seal ring 110 may have a radially outward facing surface 114 and a radially inward facing surface 116. The seal ring 110 may comprise features for generating a riding film of air during rotation of the shaft 106. The runner 112 may be an annular member and may be radially displaced from the shaft 106. The runner 112 may be carried by the shaft 106 and/or may be carried by the shaft 106 via a runner mount 118. The runner 112 may have a radially outward facing surface 120 extending axially along the shaft 106.

At Block 205 the rotatable shaft 106 is rotated within a predetermined range of rotational speeds. Rotation of the rotatable shaft 106 causes sealing engagement of the air riding carbon seal ring 110 and circumferential ceramic runner 112. Once the shaft 106 rotates above a predetermined rotational speed, the seal ring 110 is configured to generate a riding film of air between the radially inward facing seal surface 116 of the seal ring 110 and the radially outward facing seal surface 120 of the runner 112. The seal ring 110 thus remains engaged with the runner 112 but, owing to the riding film of air, has a greatly reduced friction and heat generation between the seal ring 110 and runner 112. The radially inward facing seal surface 116 of the seal ring 110 may be sealingly engaged with the radially outward facing seal surface 120 of the runner 112.

At Block 207 a seal housing 122 is optionally provided and coupled to the sump housing 108. The seal housing 122 may be disposed between the runner 112 and the sump housing 108, and/or between the seal ring 110 and the sump housing 108. The seal housing 122 may comprise an axially-extending portion 121 and a radially-extending portion 123. The axially extending portion 121 may be engaged with or in contact with the sump housing 108.

At Block 209 the air riding carbon seal ring 110 may be engaged with the seal housing 122. The radially extending portion 123 of the seal housing 122 may comprise an axially facing surface 132 and may be engaged with or in contact with the seal ring 110. The seal ring 110 may sealingly engage the axially facing surface 132 of the radially extending portion 123 of the seal housing 122.

At Block 211 a garter spring 129 may be engaged about the air riding carbon seal ring 110. The garter spring 129 may be disposed radially outward of and engaged with a radially outer surface of the seal ring 110. The garter spring 129 may aide with maintaining engagement of the seal ring 110 to the runner 112. The garter spring 129 may be configured such that the radially inward force of the garter spring 129 maintains contact of the seal ring 110 to runner 112 when the shaft 106 is rotating below a predetermined rotational speed.

At Block 213 the air riding carbon seal ring 110 may be contacted by an axial coil spring 137. The axial spring 137 may extend between a back plate 135 and the seal ring 110. The axial spring 137 may apply a force in an axially forward direction to aide in maintaining engagement of the seal ring 110 to the portion 123 of the seal housing 122. The axial spring 137 may be partly disposed in a recess 139 defined by the seal ring 110. The axial spring 137 may be a coil spring. The axial spring 137 may forcibly engage the seal ring 110 to the seal housing 122.

Method 200 ends at Block 215.

Although examples are illustrated and described herein, embodiments are nevertheless not limited to the details shown, since various modifications and structural changes may be made therein by those of ordinary skill within the scope and range of equivalents of the claims.

What is claimed is:

1. A seal assembly for sealing a higher pressure fluid cavity from a lower pressure fluid cavity, the seal assembly comprising:
 a rotatable shaft;
 a sump housing radially displaced from said rotatable shaft, said higher pressure fluid cavity and said lower pressure cavity at least partially disposed between said rotatable shaft and said sump housing;
 an air riding carbon seal ring, said carbon seal ring sealingly engaged with said sump housing and including a radially inward facing seal surface; and
 a circumferential ceramic runner carried by the shaft and having a radially outward facing seal surface extending axially along the shaft;
 wherein said radially inward facing seal surface of said air riding carbon seal ring sealingly engages said radially outward facing seal surface of said ceramic runner during rotation of said rotatable shaft at a predetermined range of rotational speeds, and
 wherein the seal assembly is oil-free such that oil is not directly applied to the air riding carbon seal ring nor the circumferential ceramic runner.

2. The seal assembly of claim 1, wherein said radially inward facing seal surface of said air riding carbon seal ring sealingly engages said radially outward facing seal surface of said ceramic runner in response to said rotatable shaft i-s rotating below a predetermined rotational speed.

3. The seal assembly of claim 1, wherein said air riding carbon seal ring comprises a radially outward facing surface, said seal assembly further comprising: a seal housing disposed between said air riding carbon seal ring and said sump housing; and a sealing body sealingly engaged between said sump housing and said seal housing.

4. The seal assembly of claim 3, wherein said seal housing defines an axially facing surface, and wherein said air riding carbon seal ring sealingly engages said axially facing surface.

5. The seal assembly of claim 4, further comprising an axial coil spring contacting said air riding carbon seal ring at a surface opposite said axially facing surface of said seal housing, said axial coil spring forcibly engaging said air riding carbon seal ring to said seal housing.

6. The seal assembly of claim 5, further comprising a back plate in contact with said axial coil spring.

7. The seal assembly of claim 6, further comprising a mounting element affixed around a circumference of the shaft and carrying the ceramic runner.

8. The seal assembly of claim 2, further comprising a garter spring positioned radially outward of said air riding carbon seal ring and generating a radially inward force onto said air riding carbon seal ring,
wherein said radially inward force generated by the garter spring maintains said air riding carbon seal ring in sealing engagement with said ceramic runner in response to said rotatable shaft rotating below said predetermined rotational speed.

9. The seal assembly of claim 1, wherein said ceramic runner comprises one or more of silicon nitride, silicon carbide, and alumina.

10. An oil-free circumferential seal assembly for a machine having a rotatable shaft and an axis of rotation, said seal assembly comprising:
a circumferential air riding carbon seal ring, said seal ring including a radially outward surface and a radially inward facing seal surface;
a ceramic runner having a radially outward facing seal surface extending axially along the shaft;
a mounting element affixed around a circumference of the shaft and carrying the ceramic runner; and
a garter spring coupled to the radially outward facing surface of the seal ring, the garter spring generating a radially inward force onto said air riding carbon seal ring so as to sealingly engage the radially inward facing seal surface of the seal ring with the radially outward facing seal surface of the ceramic runner across a predetermined range of rotational speeds, and
wherein the seal assembly is oil-free such that oil is not directly applied to the air riding carbon seal ring nor the circumferential ceramic runner.

11. The seal assembly of claim 10, wherein said radially inward force generated by the garter spring maintains said air riding carbon seal ring in sealing engagement with said ceramic runner in response to said rotatable shaft rotating below a predetermined rotational speed.

12. The seal assembly of claim 11, further comprising:
a seal housing disposed radially outward of said seal ring;
a sump housing radially displaced from said rotatable shaft; and
a sealing body positioned between said seal housing and said sump housing,
wherein said seal housing defines an axially facing surface, and wherein said air riding carbon seal ring sealingly engages said axially facing surface.

13. The seal assembly of claim 12, further comprising an axial coil spring contacting said air riding carbon seal ring at a surface opposite said axially facing surface of said seal housing, said axial coil spring forcibly engaging said air riding carbon seal ring to said seal housing.

14. A method of sealing a high pressure fluid cavity from a low pressure fluid cavity, said cavities at least partially disposed between a rotatable shaft and a sump housing radially displaced from said rotatable shaft, the method comprising:
providing a circumferential ceramic runner having a radially outward facing seal surface extending axially along the shaft and an air riding carbon seal ring including a radially inward facing seal surface; and
rotating said rotatable shaft within a predetermined range of rotational speeds to sealingly engage said radially inward facing seal surface of said air riding carbon seal ring with said radially outward facing seal surface of said ceramic runner,
wherein the seal assembly is oil-free such that oil is not directly applied to the air riding carbon seal ring nor the circumferential ceramic runner.

15. The method of claim 14, further comprising: providing a seal housing coupled to said sump housing; and engaging said air riding carbon seal ring with said seal housing.

16. The method of claim 15, wherein said air riding carbon seal ring comprises a radially outward facing surface, the method further comprising: engaging a garter spring about the radially outward facing surface of the air riding carbon seal ring.

17. The method of claim 16, wherein said seal housing defines an axially facing surface, the method further comprising: sealingly engaging the air riding carbon seal ring to said axially facing surface.

18. The method of claim 17, further comprising: contacting said air riding carbon seal ring at a surface opposite said axially facing surface with an axial coil spring, said axial coil spring forcibly engaging said air riding carbon seal ring to said seal housing.

19. The method of claim 14, further comprising: providing a mounting element affixed around a circumference of the shaft and carrying the ceramic runner; and flexing the ceramic runner relative to the shaft.

\* \* \* \* \*